United States Patent
Kumar et al.

(10) Patent No.: US 12,396,060 B2
(45) Date of Patent: Aug. 19, 2025

(54) METHOD AND MUSIM UE FOR HANDLING RETRY OF NAS PROCEDURE IN NETWORK

(71) Applicant: Samsung Electronics Co., Ltd., Suwon-si (KR)

(72) Inventors: Lalith Kumar, Bangalore (IN); Varini Gupta, Bangalore (IN); Danish Ehsan Hashmi, Bangalore (IN); Mahmoud Watfa, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 17/681,007

(22) Filed: Feb. 25, 2022

(65) Prior Publication Data
US 2022/0312548 A1    Sep. 29, 2022

(30) Foreign Application Priority Data

Feb. 26, 2021 (IN) ............................ 202141008254
Feb. 18, 2022 (IN) ............................ 2021 41008254

(51) Int. Cl.
*H04W 72/04* (2023.01)
*H04W 76/20* (2018.01)
(Continued)

(52) U.S. Cl.
CPC ........... *H04W 76/36* (2018.02); *H04W 76/20* (2018.02); *H04W 76/38* (2018.02)

(58) Field of Classification Search
CPC ..... H04W 76/36; H04W 76/20; H04W 76/38; H04W 76/19; H04W 76/34; H04W 60/00; H04W 8/183
See application file for complete search history.

(56) References Cited

U.S. PATENT DOCUMENTS

2010/0099402 A1*  4/2010  Wu ................... H04W 76/18
                                                    455/423
2014/0355417 A1* 12/2014  Kim .................. H04L 41/0654
                                                    370/221
(Continued)

OTHER PUBLICATIONS

Apple, "NAS procedures initiated in connected mode and lower layers indicate that the RRC, connection has been suspended," 3GPP TSG-CT WG1 Meeting #128-e, C1-210832, Feb. 25-Mar. 5, 2021.

(Continued)

*Primary Examiner* — Mahbubul Bar Chowdhury
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method for handling a Non access stratum (NAS) procedure (e.g., service request (SR) procedure or the like) by a user equipment (UE) in a wireless network is provided. The method includes triggering the SR procedure and determining a transmission failure of the SR or a control plane service request message in response to triggering the SR procedure. Further, the method includes determining whether the SR procedure is triggered for a reason comprising one of requesting the wireless network to release a NAS signaling connection, and rejecting a paging request from the wireless network, or requesting the wireless network to release the NAS signaling connection. Further, the method includes performing one of aborting the SR procedure triggered due to the reason in response to determining the transmission failure, or re-triggering the SR procedure triggered not due to the reason in response to determining the transmission failure.

12 Claims, 12 Drawing Sheets

(51) Int. Cl.
  *H04W 76/36* (2018.01)
  *H04W 76/38* (2018.01)

(56) References Cited

U.S. PATENT DOCUMENTS

| | | | |
|---|---|---|---|
| 2016/0127884 A1* | 5/2016 | Kim | H04W 60/04 |
| | | | 455/435.2 |
| 2017/0245188 A1* | 8/2017 | Kim | H04W 48/16 |
| 2018/0160422 A1* | 6/2018 | Pathak | H04W 76/10 |
| 2020/0323020 A1* | 10/2020 | Liu | H04L 67/14 |
| 2021/0037415 A1* | 2/2021 | Liu | H04W 28/06 |
| 2021/0051577 A1* | 2/2021 | Won | H04W 48/02 |
| 2021/0258779 A1* | 8/2021 | Chang | H04W 12/041 |
| 2021/0258857 A1* | 8/2021 | Won | H04W 48/18 |
| 2022/0053448 A1* | 2/2022 | Velev | H04W 8/183 |
| 2022/0240222 A1* | 7/2022 | Youn | H04W 60/005 |
| 2022/0264506 A1* | 8/2022 | Kiss | H04W 60/00 |

OTHER PUBLICATIONS

Ericsson, Motorola Mobility, Lenovo, Qualcomm Incorporated, Apple, Samsung, InterDigital, "MUSIM solutions for Key Issue 3," SA WG2 Meeting #136-AH S2-2001719, Jan. 13-27, 2020, Incheon, Korea.

MediaTek Inc., "FS_MUSIM: KI#1&3—Handling of Busy and Leaving indications," SA WG2 Meeting #143E S2-2100825, Feb. 24-Mar. 9, 2021.

Nokia, Nokia Shanghai Bell, "Solution for improved paging in MUSIM devices (KI#1,2,3)," SA WG2 Meeting #136-AH 8S2-2000855, Incheon, Korea, Jan. 13-17, 2020.

MediaTek Inc., "FS_MUSIM: NAS-triggered graceful RRC release," SA WG2 Meeting #136AH S2-2001419, Incheon, Korea, Jan. 13-17, 2020.

International Search Report and written opinion dated Jun. 14, 2022, issued in International Application No. PCT/KR2022/002801.

* cited by examiner

METHOD AND MUSIM UE FOR HANDLING RETRY OF NAS PROCEDURE IN NETWORK

CROSS-REFERENCE TO RELATED APPLICATION(S)

This application is based on and claims priority under 35 U.S.C. § 119(a) of an Indian Provisional patent application number 202141008254, filed on Feb. 26, 2021, in the Indian Intellectual Property Office, and of an Indian Complete patent application number 202141008254, filed on Feb. 18, 2022, in the Indian Intellectual Property Office, the disclosure of each of which is incorporated by reference herein in its entirety.

BACKGROUND

1. Field

The disclosure relates to the field of telecommunication networks. More particularly, the disclosure relates to a method and system of handling a retry of Non access stratum (NAS) procedure for a multi universal subscriber identification module (MUSIM) user equipment (UE) in a wireless network.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system of handling a retry of NAS procedure for a MUSIM UE in a wireless network.

Additional aspects will be set forth in part in the description which follows and, in part, will be apparent from the description, or may be learned by practice of the presented embodiments.

In accordance with an aspect of the disclosure, a method for handling a NAS procedure, for example service request (SR) procedure, by a UE (e.g., MUSIM UE) in a wireless network is provided. The method includes triggering, by the UE, the SR procedure and determining, by UE, a transmission failure of the SR or a control plane service request message in response to triggering the SR procedure. Further, the method includes determining, by the UE, whether the SR procedure is triggered for a reason comprising one of requesting the wireless network to release a NAS signaling connection, or rejecting a paging request from the wireless network and requesting the wireless network to release the NAS signaling connection. Further, the method includes performing, by the UE, one of aborting the SR procedure triggered due to the reason in response to determining the transmission failure, or re-triggering the SR procedure triggered not due to the reason in response to determining the transmission failure.

In an embodiment, the method includes locally releasing, by the UE, the NAS signaling connection and stopping, by the UE, a timer T3517. Further, the method includes locally releasing, by the UE, resources allocated for the service request procedure.

In accordance with another aspect of the disclosure, a UE (e.g., MUSIM UE) for handling a NAS procedure (e.g., SR procedure or the like) in a wireless network is provided. The UE includes a SR procedure controller connected to the memory and a processor. The SR procedure controller is configured to trigger the SR procedure and determine a transmission failure of the SR or a control plane service request message in response to triggering the SR procedure. Further, the SR procedure controller is configured to determine whether the SR procedure is triggered for a reason comprising one of requesting the wireless network to release a NAS signaling connection, or rejecting a paging request from the wireless network and requesting the wireless network to release the NAS signaling connection. Further, the SR procedure controller is configured to perform one of aborting the SR procedure triggered due to the reason in response to determining the transmission failure, or re-triggering the SR procedure triggered not due to the reason in response to determining the transmission failure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
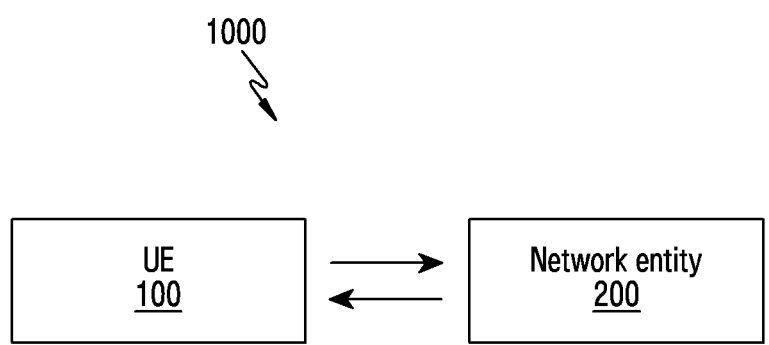
FIG. 1 illustrates an overview of a wireless network for handling a NAS procedure (e.g., SR procedure), according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Definitions for other certain words and phrases are provided throughout this patent document. Those of ordinary skill in the art should understand that in many if not most instances, such definitions apply to prior as well as future uses of such defined words and phrases.

Traditionally when a Non access stratum (NAS) procedure (e.g., registration procedure, service request procedure or the like) is executed by a User Equipment (UE) in a wireless communication network and if the UE faces the abnormal case, then the UE keeps re-attempting the respective NAS procedure till attempt counter reaches the maximum value. For example, a guard timer of a registration procedure (i.e. hereafter called as first timer example T3510) expires then the UE considers that there was some issue in reaching the network and hence there was no response from the network for the sent registration request message. Further, the UE starts a second timer (e.g., T3511) and after the expiry of second timer T3511, the UE will re-send the registration procedure and this continuous after all the attempts when attempt counter reaches Max value (for example 4 or 5). Further, the UE will move to attempting to register state and start a long duration timer T3502 to attempt again. Thus, in prior art, the UE once it attempts registration procedure it keeps attempting to perform registration procedure unless the registration procedure is successful. This method of prior art needs to be re-visited for multi-USIM (MUSIM) devices due to the new feature called as Busy (also called as paging reject) or leaving procedure where the UE is triggering the respective NAS procedure to request the network to release the NAS signaling connection release. Hence, the MUSIM UE can switch to alternate SIM quickly and continue with the intended services as quickly as possible but if the MUSIM UE keeps running the retry timers and attempting to execute the NAS procedure there will be considerable delay impacting the user experience in initiating the intended service on alternate (or second) SIM in 3rd Generation partnership project (3GPP) networks.

Thus, it is desired to address the above mentioned disadvantages or other shortcomings or at least provide a useful alternative.

The principal object of the embodiments herein is to provide a method and System to handle a retry of a NAS procedure (e.g., service request (SR) procedure or the like) for a MUSIM UE in a wireless network.

Another object of the embodiments herein is to provide that the UE aborts SR procedure after transmission failure of a SR message if the SR is triggered when the UE supports a MUSIM and the UE is in a 5G mobility management (5GMM)-CONNECTED mode or the UE is in a 5GMM-CONNECTED mode with a radio resource control (RRC) inactive indication, rejects the Radio Access Network (RAN) paging. The UE requests the network to release the NAS signaling connection and optionally includes paging restrictions, so as to avoid the resource wastage in the wireless network and improve the user experience.

Another object of the embodiments herein is to provide that the UE aborts a SR procedure after transmission failure of the SR message if the SR is triggered when the UE supports MUSIM and is in a 5GMM-IDLE mode and the UE responds to paging rejects the paging request from the network, requests the network to release the NAS signaling connection and optionally includes paging restrictions, so as to avoid the resource wastage in the wireless network and improve the user experience.

Accordingly, the embodiment herein is to provide a method and System to manage NAS procedure (e.g., SR procedure or the busy procedure) in 3rd Generation Partnership Project (3GPP) network (e.g., 5G network). The proposed method provides an opportunity to a User Equipment (UE) to execute the busy features (also called as paging reject feature) without impacting the services on the alternate Subscriber Identity Module (SIM).

The proposed method provides an opportunity to the UE to execute the busy features without impacting the services on the alternate Subscriber Identity Module (SIM).

The UE aborts SR procedure after transmission failure of a SR message if the SR is triggered When the UE supports MUSIM and the UE is in a 5GMM-CONNECTED mode or the UE is in a 5GMM-CONNECTED mode with an RRC inactive indication, rejects the RAN paging. The UE requests the network to release the NAS signaling connection and optionally includes paging restrictions. Thus, results in avoiding the resource wastage in the wireless network and improving the user experience.

The UE aborts SR procedure after transmission failure of a SR message if the SR is triggered when the UE supports MUSIM and in a 5GMM-IDLE mode and the UE responds to paging rejects the paging request from the network, requests the network to release the NAS signaling connection and optionally includes paging restrictions. Thus, results in avoiding the resource wastage in the wireless network and improving the user experience.

In an embodiment, if a current Tracking Area Identity (TAI) is part of a TAI list, the UE shall restart the service request procedure unless the service request procedure is initiated when the UE supports a MUSIM and the UE is in a 5GMM-CONNECTED mode or the UE is in a 5GMM-CONNECTED mode with a radio resource control (RRC) inactive indication, rejects the Radio Access Network (RAN) paging. The UE requests the network to release the NAS signaling connection and optionally includes paging restrictions. Further, the UE shall abort the service request procedure, enters state 5GMM-REGISTERED, locally release the N1 NAS signaling connection, stop timer T3517 and locally release any resources allocated for the service request procedure.

In an embodiment, if the current TAI is part of the TAI list, the UE shall restart the service request procedure unless the service request procedure is initiated when the UE aborts a SR procedure after transmission failure of the SR message if the SR is triggered when the UE supports MUSIM and is in a 5GMM-IDLE mode and the UE responds to paging rejects the paging request from the network, requests the network to release the NAS signaling connection and optionally includes paging restrictions. Further, the UE shall abort the service request procedure, enters state 5GMM-REGISTERED, locally release the N1 NAS signaling connection, stop timer T3517 and locally release any resources allocated for the service request procedure.

Referring now to the drawings and more particularly to FIGS. 1 to 3, 5, 7, 9, and 10, where similar reference characters denote corresponding features consistently throughout the figures, there are shown preferred embodiments.

FIG. 1 illustrates an overview of a wireless network (1000) for handling a NAS procedure (e.g., SR procedure), according to an embodiment of the disclosure.

In an embodiment, the wireless network (1000) includes a UE (e.g., MUSIM UE) (100) and a network entity (200). The wireless network (1000) can be, for example, but not limited to a 5G network, a 6G network and an open radio access network (O-RAN) network. The UE (100) can be, for example, but not limited to a laptop, a desktop computer, a notebook, a relay device, a Device-to-Device (D2D) device, a vehicle to everything (V2X) device, a smartphone, a tablet, an immersive device, and an internet of things (IoT) device.

The UE (100) is configured to trigger the SR procedure and determine a transmission failure of the SR or a control plane service request message in response to triggering the SR procedure. Further, the UE (100) is configured to determine whether the SR procedure is triggered for a reason comprising one of requesting the wireless network (1000) to release a NAS signaling connection, and rejecting a paging request from the wireless network (1000) and requesting the wireless network (1000) to release the NAS signaling connection. This embodiment explains taking SR procedure or registration procedure as an example but same disclosure is applicable when other NAS procedures like deregistration procedure are triggered by the UE (100). The UE (100) indicates as part of NAS procedure busy indication using UE request type information element set to "Rejection of paging" in NAS message. Also, the UE (100) can request "NAS signaling connection release" and request network to release the NAS signaling connection, with this indication(s) network is expected to abort/store the downlink data or downlink signaling pending for the UE (100) and release the NAS signaling connection.

Further, the UE (100) is configured to perform one of aborting the SR procedure triggered due to the reason in response to determining the transmission failure, and re-triggering the SR procedure triggered not due to the reason in response to determining the transmission failure.

Further, the UE (100) is configured to locally release the NAS signaling connection and stop a timer T3517. Further, the UE (100) is configured to locally release resources allocated for the service request procedure.

Figure 2:
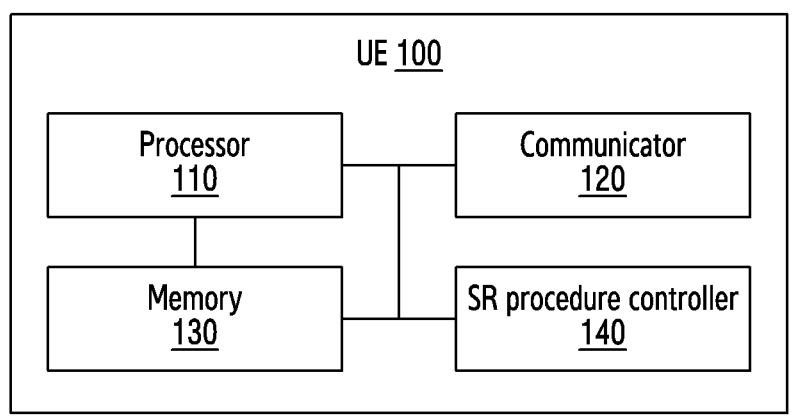
FIG. 2 shows various hardware components of a UE (e.g., MUSIM UE), according to an embodiment of the disclosure.

FIG. 2 shows various hardware components of the UE (100), according to an embodiment of the disclosure.

In an embodiment, the UE (100) includes a processor (110), a communicator (120), a memory (130), and a SR procedure controller (140). The processor (110) is coupled with the communicator (120), the memory (130) and the SR procedure controller (140).

Further, the SR procedure controller (140) is configured to trigger the SR procedure and determine a transmission failure of the SR or the control plane service request message in response to triggering the SR procedure. Further, the SR procedure controller (140) is configured to determine whether the SR procedure is triggered for a reason comprising one of requesting the wireless network (1000) to release a NAS signaling connection, and rejecting a paging request from the wireless network (1000) and requesting the wireless network (1000) to release the NAS signaling connection. Further, the SR procedure controller (140) is configured to perform one of aborting the SR procedure triggered due to the reason in response to determining the transmission failure, and re-triggering the SR procedure triggered not due to the reason in response to determining the transmission failure.

Further, the SR procedure controller (140) is configured to locally release the NAS signaling connection and stop a timer T3517. Further, the SR procedure controller (140) is configured to locally release resources allocated for the service request procedure.

The SR procedure controller (140) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include lesser or greater number of components. Further, the labels or names of the components are used only for illustrative purpose and does not limit the scope of the disclosure. One or more components can be combined together to perform same or substantially similar function in the UE (100).

Figure 3:
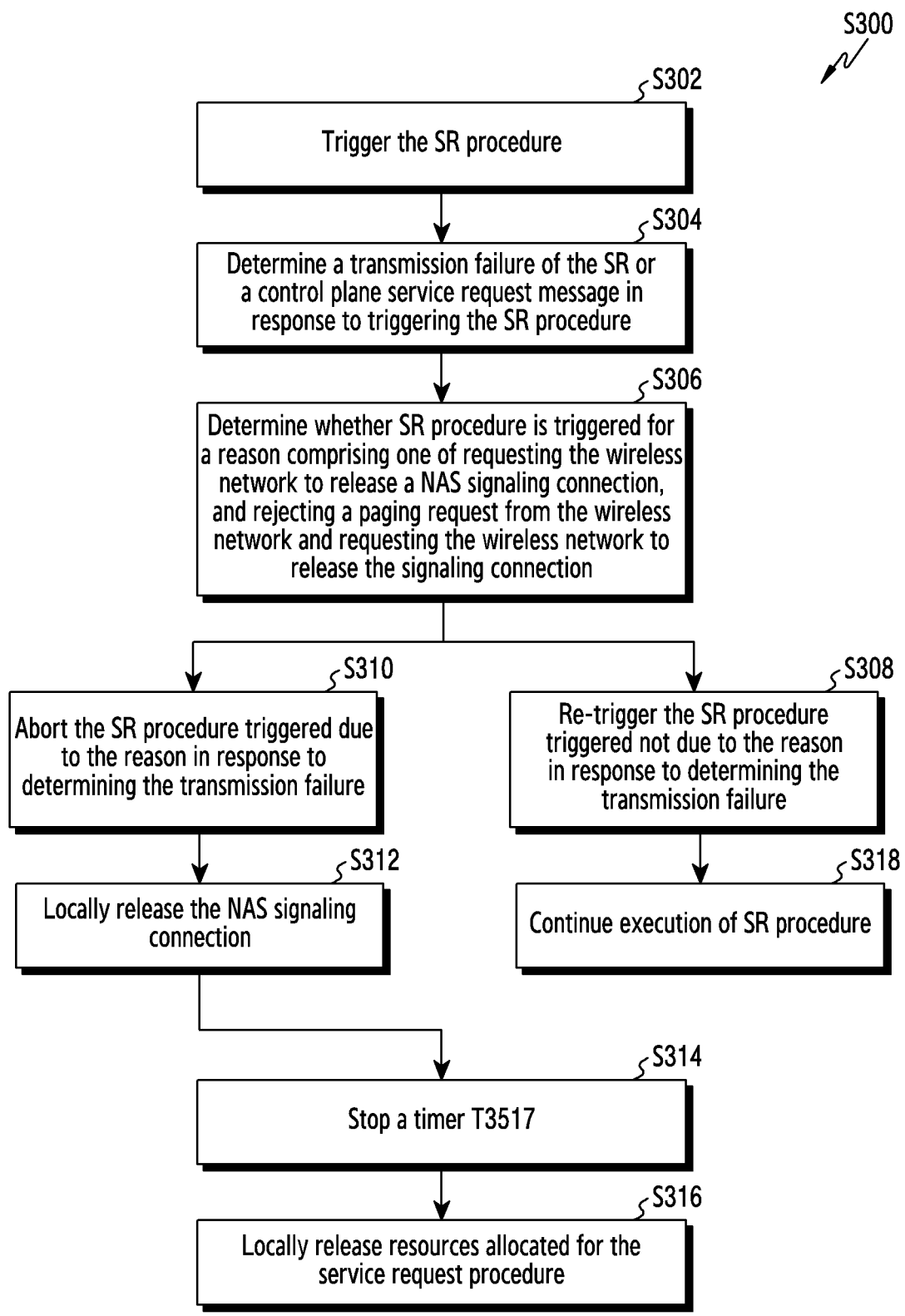
FIG. 3 is a flow chart illustrating a method for handling a SR procedure in the wireless network, according to an embodiment of the disclosure.

FIG. 3 is a flow chart (S300) illustrating a method for handling the SR procedure in the wireless network (1000), according to an embodiment of the disclosure.

The operations (S302-S314) are performed by the SR procedure controller (140).

At operation S302, the method includes triggering the SR procedure. At operation S304, the method includes determining the transmission failure of the SR or a control plane service request message in response to triggering the SR procedure. At operation S306, the method includes determining whether SR procedure is triggered for the reason comprising one of requesting the wireless network (1000) to release the NAS signaling connection, and rejecting the paging request from the wireless network (1000) and requesting the wireless network (1000) to release the signaling connection.

At operation S308, the method includes re-triggering the SR procedure triggered not due to the reason in response to determining the transmission failure. At operation S310, the method includes aborting the SR procedure triggered due to the reason in response to determining the transmission failure.

At operation S312, the method includes locally releasing the NAS signaling connection. At operation S314, the method includes stopping the timer T3517. At operation S316, the method includes locally releasing resources allocated for the service request procedure. At operation S318, the method includes continue executing the SR procedure in response to re-triggering the SR procedure.

Figure 4:
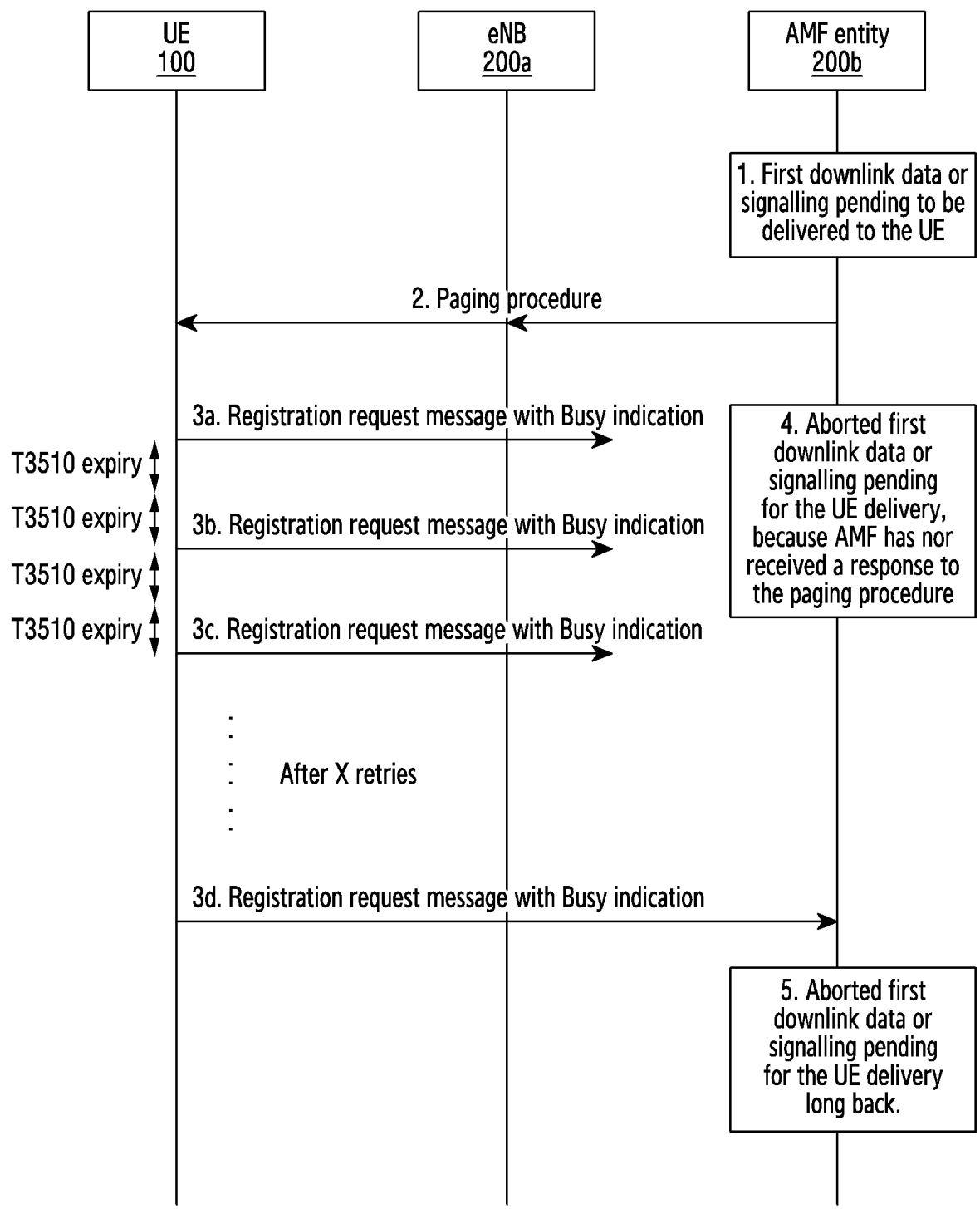
FIG. 4 is a signaling diagram illustrating a scenario where a UE receives paging message from network due to first downlink data, according to the related art.

FIG. 4 is a signaling diagram illustrating a scenario where the UE (100) receives the paging message from the network entity due to first downlink data, according to the related art.

Referring to the scenario illustrated in FIG. 4, the steps are as follows:

1. The UE-1 (for example part of MUSIM UE) receives the paging message from the network due to first downlink data/signaling.

2. The UE-2 is busy due to ongoing service and thus MUSIM UE decides not to respond to paging message with service request to the network to receive the downlink data or signaling message.

3. Thus UE-1 will send the NAS procedure like registration request or service request message with busy indication (Paging reject) to the network.

4. If abnormal case occurs the UE will start the second timer for example T3511, after expiry of which the UE will re-attempt the respective NAS procedure like registration procedure.

5. But as the timer T3511 is long i.e. 10 s when UE triggers registration again indicating it is busy network might have dropped the first data/signaling message. Thus, indicating Busy with such a huge delay is of no use to the network and at the same time it will impact the throughput and performance of the alternate SIM stack as RF will be taken away by the UE-2 to send the busy indication to the network.

Figure 5:
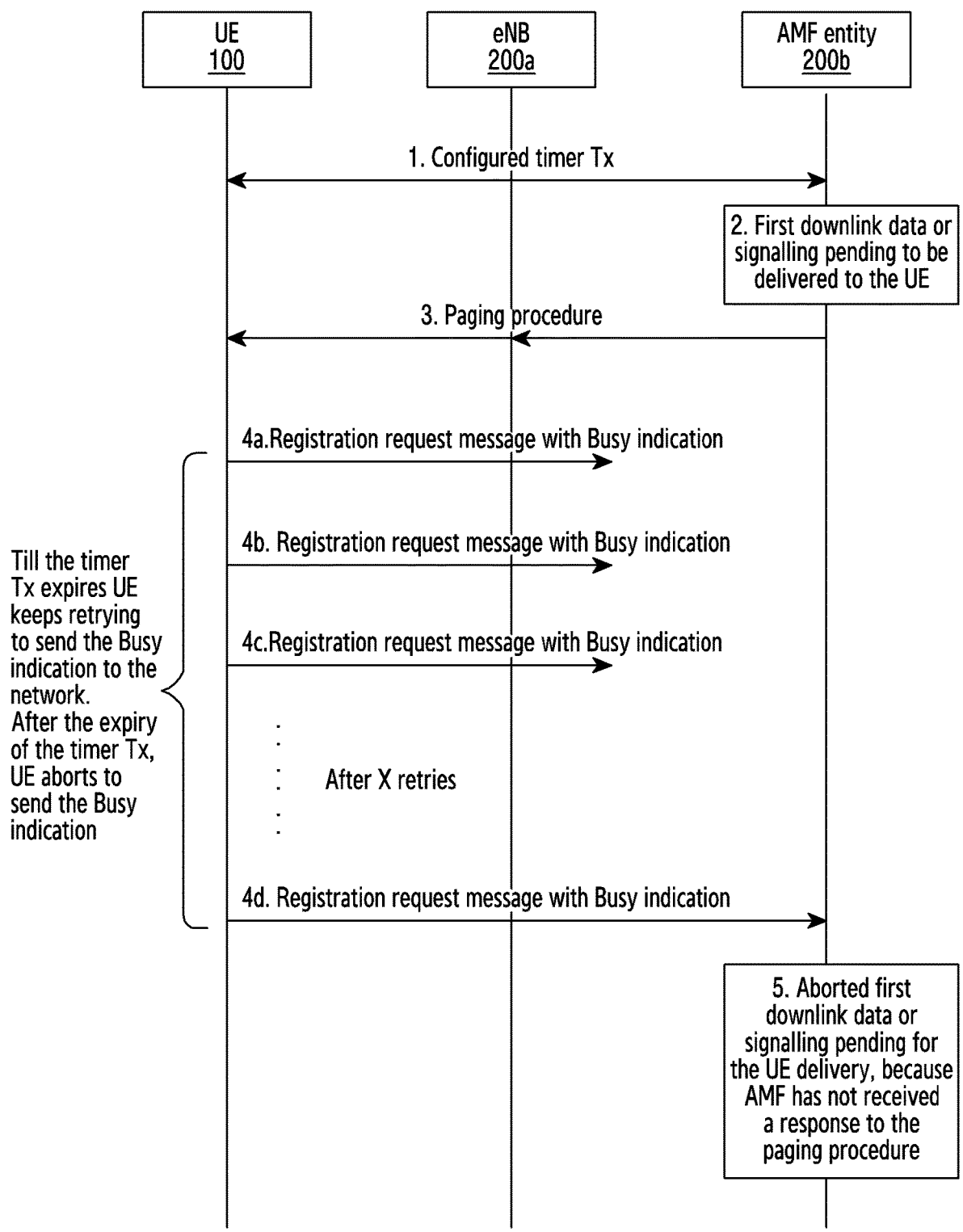
FIG. 5 is a signaling diagram illustrating a scenario of configuration of the UE using non-access stratum (NAS) message, according to an embodiment of the disclosure.

FIG. 5 is a signaling diagram illustrating a scenario of configuration of the UE (100) using the NAS message, according to an embodiment of the disclosure.

Referring to the scenario illustrated in FIG. 5, the steps are as follows:

1. The UE (100) is pre-configured or configured using the NAS message or some other protocol in the UE (100) by the network a timer Tx. The network can be serving Public Land Mobile Network (PLMN) or Home PLMN.

2. Till the timer Tx expires, the UE (100) keeps retrying to send the Busy indication to the network.

3. After the expiry of the timer Tx, the UE (100) aborts to send the Busy indication using the NAS procedure to the network. Alternative, at the expiry of timer Tx, the UE (100) can make last attempt to send the Busy indication to the network.

4. In other embodiments, when the paging procedure is received, the UE (100) sends to the network with the non access stratum (NAS) message to indicate to the network that it's Busy and hence it cannot receive downlink data or signaling message from the network. The UE (100) will attempts to send the NAS message with the busy indication, but if it is not successful to send the NAS message i.e. there is a transmission failure or no response is received from network after 'x' retries and 'x' duration, the UE (100) will abort the procedure and move back to the NORMAL service state. The number of retries 'x' is in the range of 0 to 25. The duration of "x" can be in the range 0 to 200 milliseconds.

Referring to FIG. 5, at 1, the timer Tx is configured between the access and mobility management function (AMF) entity (200b) and the UE (100). At 2, the first downlink data or signaling pending to be delivered to the UE (100). At 3, the paging procedure is received at the UE (100) from the AMF entity 200b and the evolved node B (eNB) 200a. At 4a to 4d, the UE (100) sends the registration request message with the busy indication to the AMF entity 200b. Till the timer Tx expires, the UE (100) keeps retrying to send the busy indication to the network. After the expiry of the timer Tx, the UE (100) aborts to send the busy indication. At 5, Aborted first downlink data or signaling pending for the UE delivery, because the AMF entity (200b) has not received a response to the paging procedure.

Figure 6:
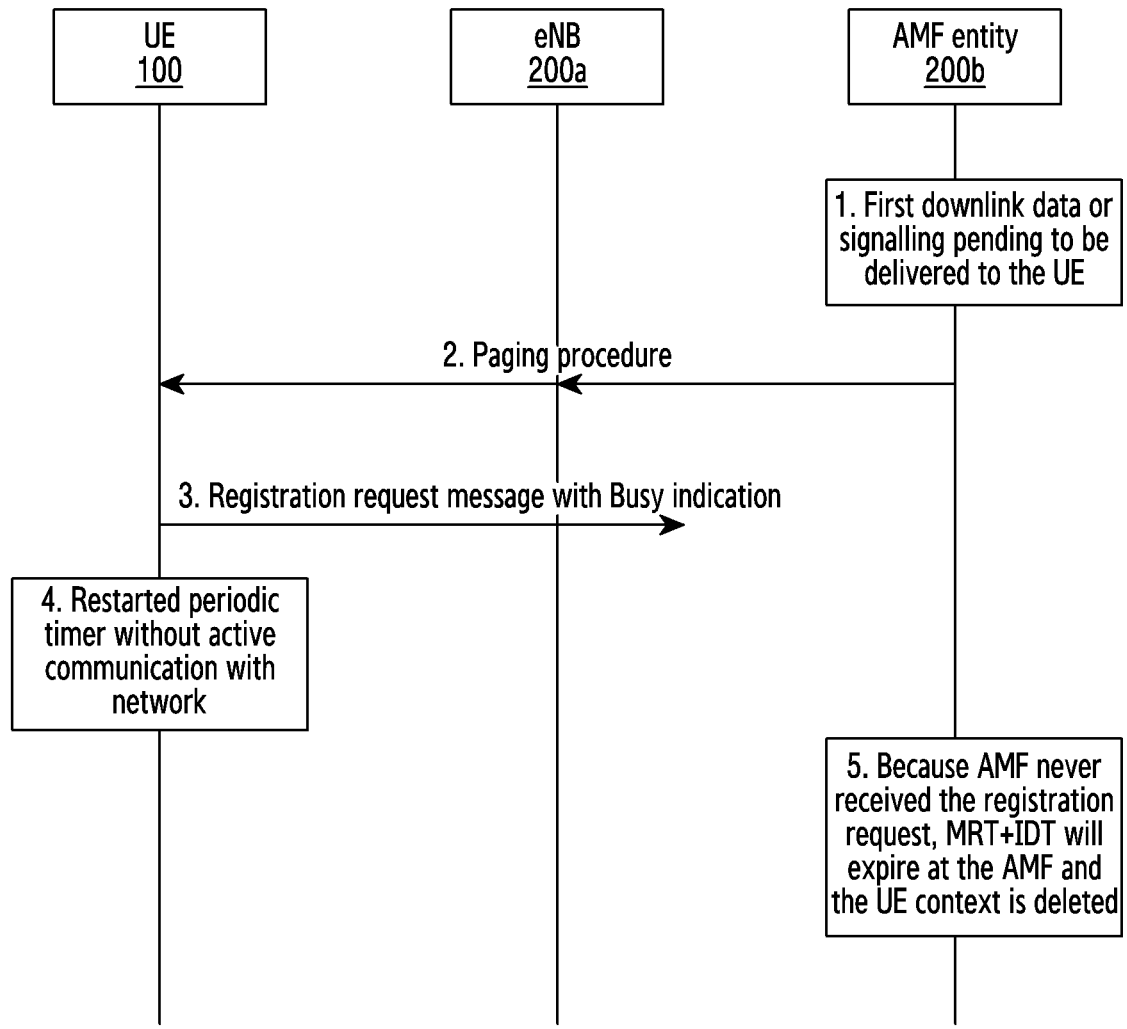
FIG. 6 is a signaling diagram illustrating a scenario of periodic registration procedure by the UE when periodic timer expires, according to the related art.

FIG. 6 is a signaling diagram illustrating a scenario of periodic registration procedure by the UE (100) when the periodic timer expires, according to the related art.

Referring to the scenario illustrated in FIG. 6, the steps for periodic registration procedure by the UE (100) are as follows:

1. UE's context is maintained at the network when the UE (100) is registered with it, if the UE (100) moves out of the registered area or gets deregistered and if the network maintains that context indefinitely it can lead for potential issues to the network for example it will have to page the UE even if the UE (100) is not available in its registered area.

a. Thus, the network maintains a timer called as Mobile reachable Timer (MRT) and Implicit deregistration timer (IDT). Before MRT and IDT gets expired it is expected that the UE (100) should come in connected mode, establish a connection with the network, execute periodic registration update procedure with this network is sure that the UE (100) is in the registered area.

2. The UE (100) executes the periodic registration procedure when periodic timer (example T3512) expires. The periodic registration timer is stopped each time UE gets into connected mode and restarted when the UE (100) gets into an IDLE mode.

Now consider a typical Dual SIM case, UE-1 and UE-2 are part of the MUSIM device, the UE-1 wants to initiate a NAS procedure, thus it requests for establishment of RRC connection, on successfully establishing the RRC Connection, the UE (100) enters into connected mode and stops the periodic registration timer. But before a NAS procedure could be established the UE-1 Radio Frequency (RF) is taken away by UE-2 for example due to voice call over UE-2. Thus, the UE-1 will have to abruptly end its procedures and get into IDLE mode and start periodic registration timer from fresh. But because the NAS message from UE-1 never reached network it continues to run MRT without restarting it. Thus, it creates a possibility of MRT+IDT expiring before the Periodic registration timer expires on the UE and unintentionally the UE context on the network side is removed. This issue is true for any abnormal case in which UE gets into connected mode but could not deliver its initial NAS message to the network. Thus, there is a need to handle the UE context by looking at triggers of starting/stopping the Periodic registration, MRT or IDT timers.

Referring to FIG. 6, At 1, the first downlink data or signaling pending to be delivered to the UE (100). At 2, the UE (100) receives the paging procedure from the AMF entity (200b)/eNB (200a). At 3, the UE (100) is about to send the registration request message with busy indication to the AMF entity (200b), but not received in the AMF entity (200b). At 4, the UE (100) restarts the periodic timer without active communication with the network. At 5, because the AMF entity (200b) never received the registration request, MRT+IDT will expire at the AMF entity (200b) and the UE context is deleted.

Figure 7:
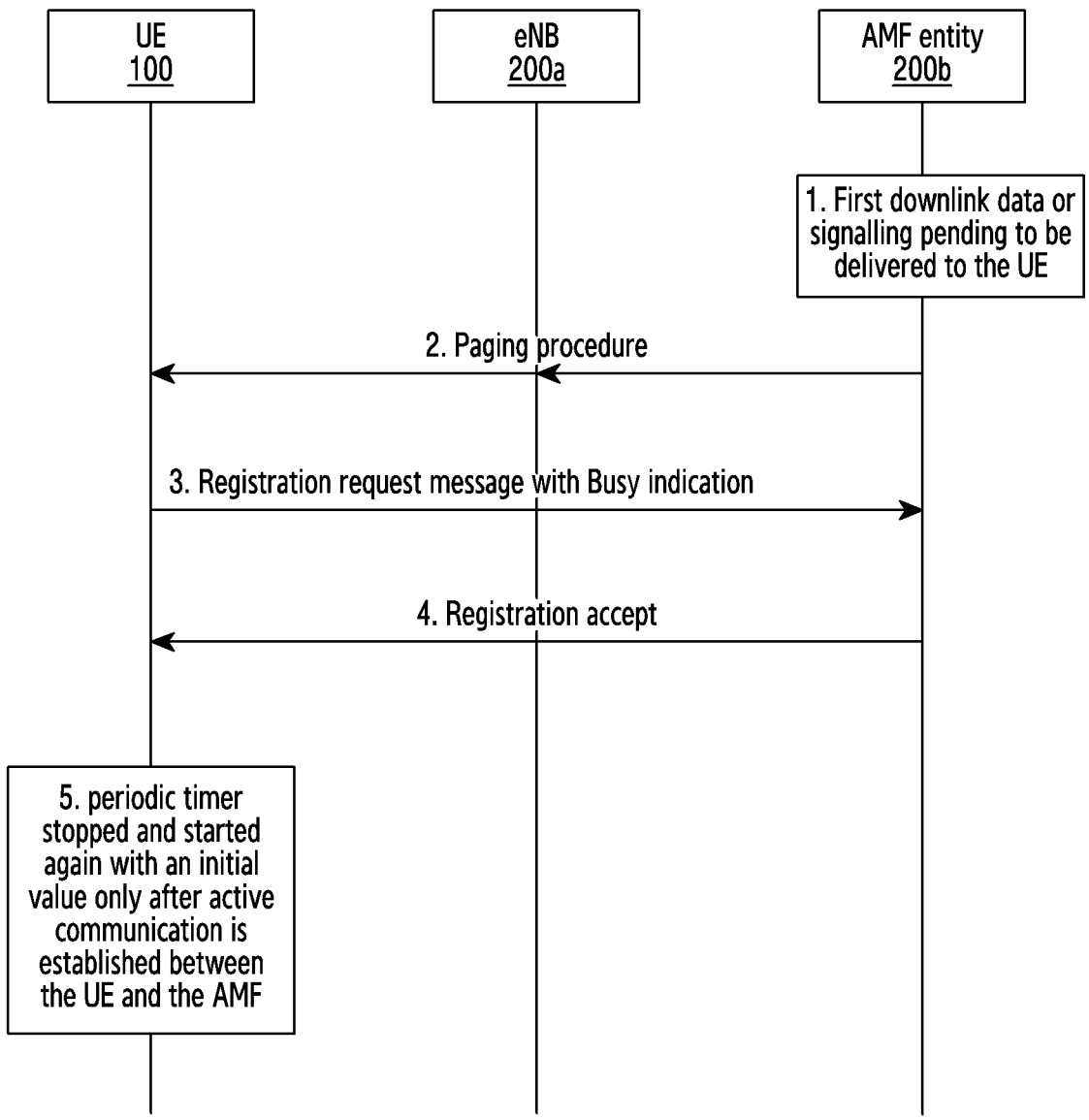
FIG. 7 is a signaling diagram illustrating a scenario of pausing of the periodic timer when radio resource control (RRC) state gets into connected mode, according to an embodiment of the disclosure.

FIG. 7 is a signaling diagram illustrating a scenario of pausing of the periodic timer when RRC state gets into the connected mode, according to an embodiment of the disclosure.

Referring to the scenario illustrated in FIG. 7, the steps are as follows:

1. The periodic timer should not be stopped when a Radio Resource Control (RRC) state gets into connected mode but rather when Initial direct transfer message is transferred successfully.

2. The periodic timer should be stopped only after successful exchange of initial NAS message with the network (i.e., after the UE (100) receives Service Accept message or data radio bearer (DRB) is established or Registration accept or deregistration accept message are received from the network).

3. The periodic timer should be stopped only after NAS N1 signaling connection is established.

In this embodiment, when the UE (100) is attempting to send Busy indication (for example with an indication called as release request) or leaving indication (for example with an indication called as release request) through registration procedure and before the registration procedure is completed UE takes away its RF to serve second universal subscriber identification module (USIM) (i.e. UE is not able to complete the registration procedure due to communication constraints) then UE shall set Update status to U2 NOT UPDATED and set the state to ATTEMPTING-REGISTRATION-UPDATE. So that UE can attempt registration whenever UE's communication constraints are resolved.

Referring to FIG. 7, at 1, the first downlink data or signaling pending to be delivered to the UE (100). At 2, the UE (100) receives the paging procedure from the AMF entity (200b)/eNB (200a). At 3, the UE (100) sends the registration request message with busy indication to the AMF entity (200b). At 4, the UE (100) receives the registration accept message from the AMF entity (200b). At 5, the UE (100) stops the periodic timer and starts again with an initial value only after active communication is established between the UE (100) and the AMF entity (200b).

Figure 8:
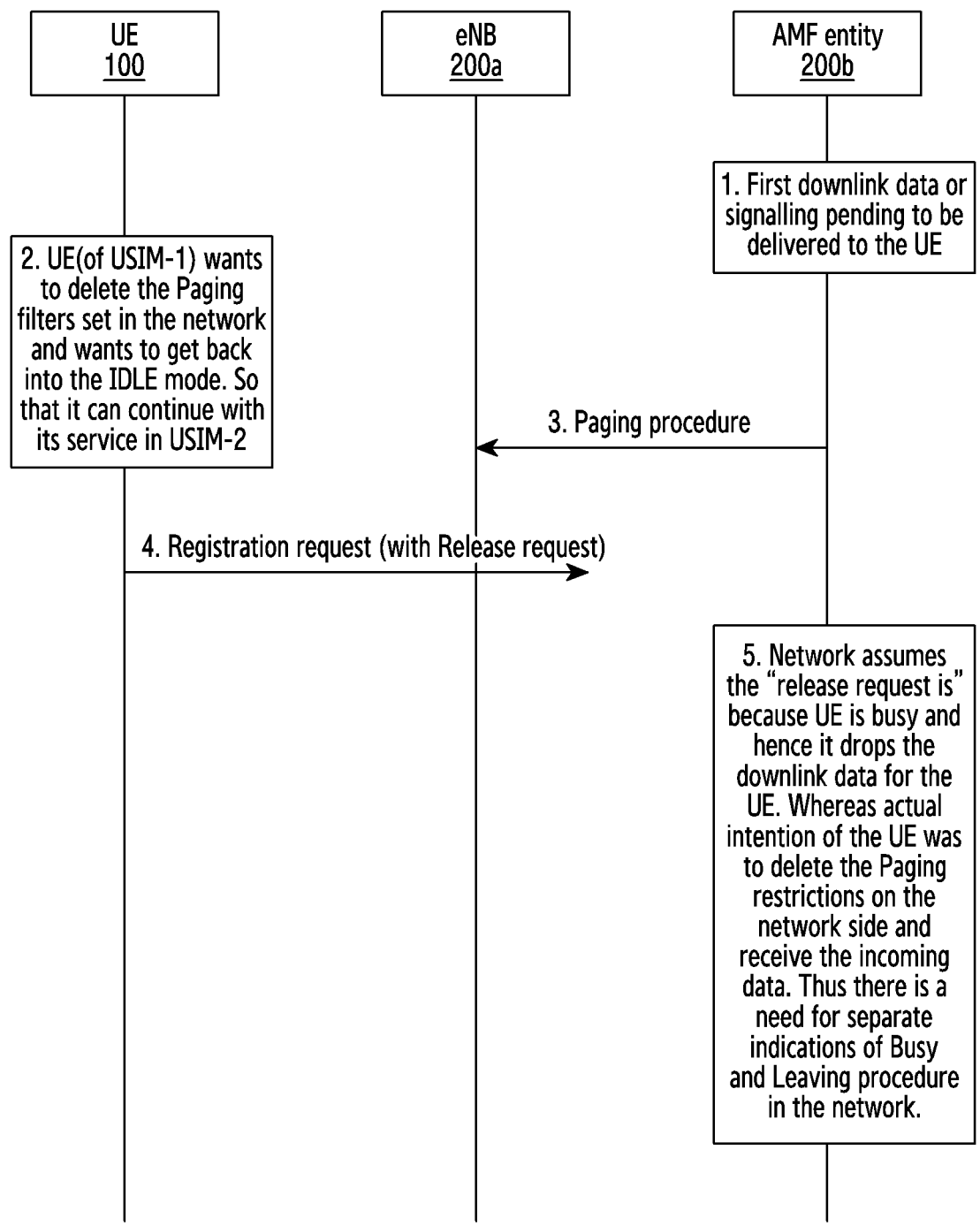
FIG. 8 is a signaling diagram illustrating a scenario where the UE receives registration request with release request message, according to the related art.

FIG. 8 is a signaling diagram illustrating a scenario where the UE (100) receives registration request with release request message, according to the related art.

Referring to the scenario illustrated in FIG. 8, below are the issues illustrated in FIG. 8.

1) UE's USIM-1 has set the paging filters in the network, so that the network does not page the UE (100) for certain services.

2) UE's USIM-2 service is ongoing and after certain time due to change in service ongoing on USIM-2 UE decides to either change the paging filters set in the network or delete the complete paging restrictions.

3a) The UE (100) initiates the NAS procedure (either service request or Registration request) towards network to indicate to the network (for example with an indication called as "release request") that it wants to for example delete the paging filters and its now OK to receive downlink data. Generally, delete paging filters is indicated by not including the Paging filters IE in the NAS message. If update is required new Paging filters are provided to the network.

3b) But at the same time network initiates the paging procedure towards the UE (100) for some other service i.e. there is a collision between step 3a and step 3b.

4) the network when it receives the NAS message with "release request" it will misunderstand that the UE (100) is busy and it does not want to take the mobile terminated (MT) signaling or MT data pending for the UE (100).

5) The network will drop the MT service (data or call or signaling) pending for the UE. This is an issue which needs to be addressed.

Figure 9:
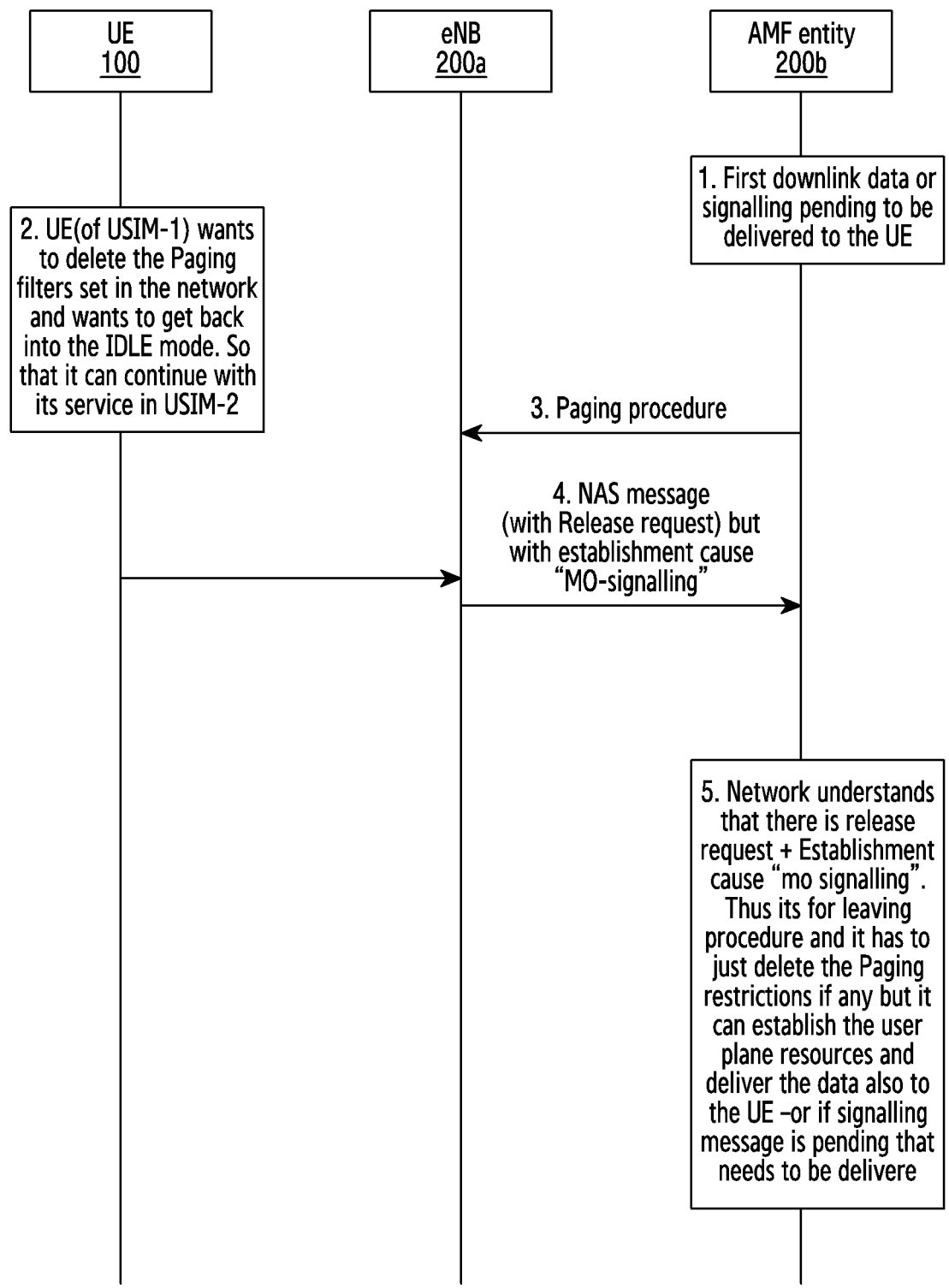
FIG. 9 is a signaling diagram illustrating a scenario of identification of leaving procedure, according to an embodiment of the disclosure.

FIG. 9 is a signaling diagram illustrating a scenario of identification of leaving procedure, according to an embodiment of the disclosure.

Referring to the scenario illustrated in FIG. 9, a proposed method below describes the solution for identification of leaving procedure.

1) UE's USIM-1 has set the paging filters in the network, so that the network does not page the UE (100) for certain services.

2) UE's USIM-2 service is ongoing and after certain time due to change in service ongoing on USIM-2 UE decides to either change the paging filters set in the network or delete the complete paging restrictions.

3a) the UE (100) initiates the NAS procedure (either service request or Registration request) towards network to indicate to the network (for example with an indication called as "release request") that it wants to for example delete the paging filters and its now OK to receive downlink data.

3b) But at the same time network initiates the paging procedure towards the UE for some other service i.e. there is a collision between step 3a and step 3b.

4) the network when it receives the NAS message with "release request" called as first indication will also check the second indication (for example called as establishment cause) to check if the NAS message received is due to UE initiated procedure or MT initiated procedure (i.e. the procedure is initiated in response to paging).

5) If first indication indicates the network to release the signaling connection and the second indication indicates that its due to mobile originated (MO) initiated procedure (for example with establishment cause MO-signaling) then network understands that this is a leaving procedure and not busy procedure. So, there is no direct impact to the mobile terminated data or mobile terminated signaling. Further based on the latest received Paging restrictions in the NAS message, network attempts to deliver the mobile terminated data or mobile terminated signaling to the UE either on the existing NAS signaling connection or after the release and re-attempting the paging procedure and getting the UE into connected mode and deliver the data/signaling.

Figure 10:
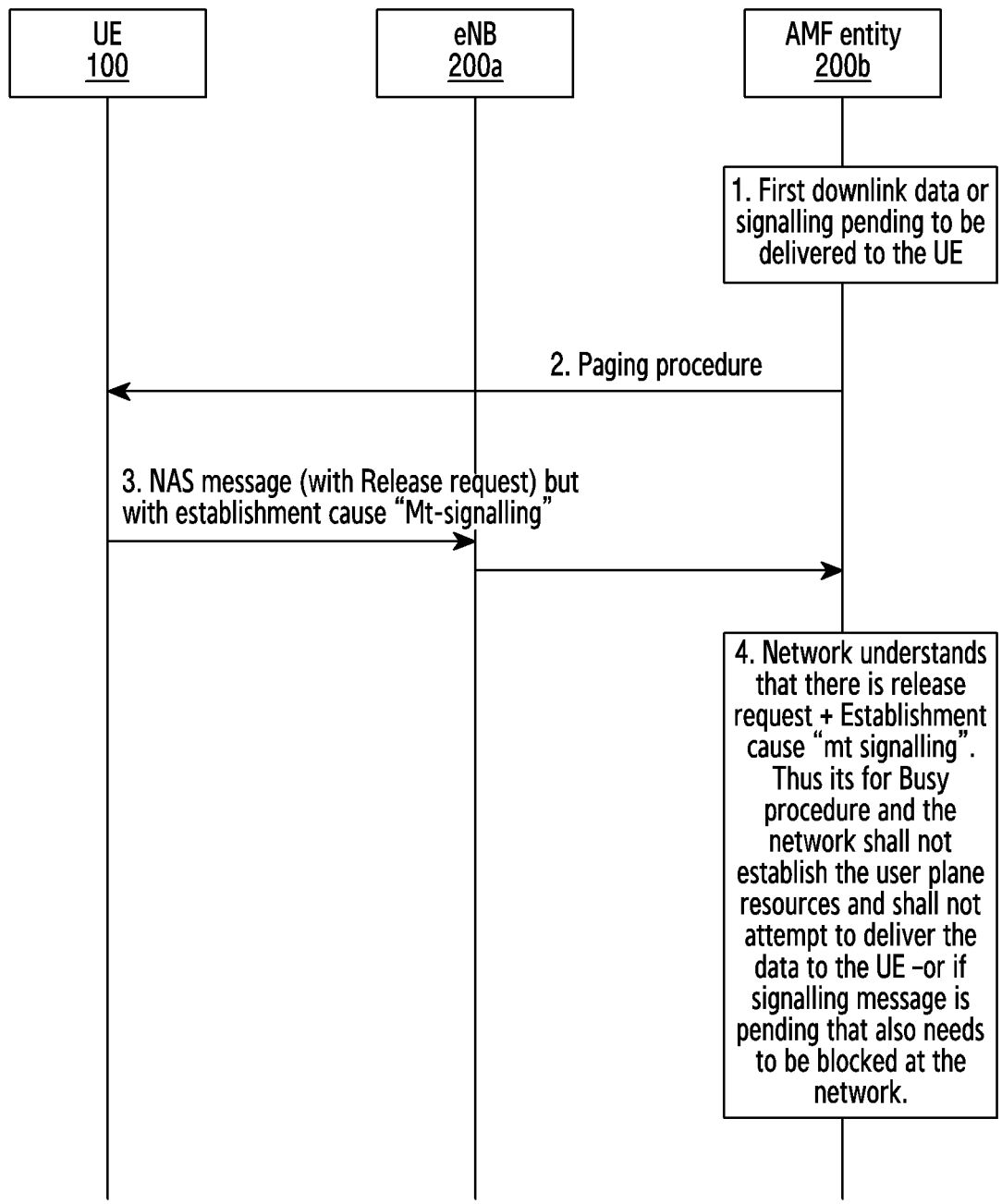
FIG. 10 is a signaling diagram illustrating a scenario of identification of NAS procedure (e.g. SR procedure or busy procedure), according to an embodiment of the disclosure.

FIG. 10 is a signaling diagram illustrating a scenario of identification of NAS procedure (e.g., SR procedure or the busy procedure), according to the embodiment of the disclosure.

Referring to the scenario illustrated in FIG. 10, a proposed method for the solutions for identification of busy procedure is as follows:

1) UE's USIM-1 has set the paging filters in the network, so that network does not page the UE for certain services.
2) UE's USIM-2 service is ongoing and priority service.
3) Network of USIM-1 initiates the Paging procedure towards the UE for some other service after taking into account the Paging filters.
3a) the UE (100) initiates a NAS procedure (either service request or Registration request) towards network to indicate to the network (for example with an indication called as "release request") that it is busy and it does not want to take the downlink signaling or data
4) The network when it receives the NAS message with "release request" called as first indication will also check the second indication (for example called as establishment cause like mt-signaling) to check if the NAS message received is due to UE initiated mobile originated procedure or MT initiated procedure (i.e. the procedure is initiated in response to paging).
5) If first indication indicates the network to release the signaling connection and the second indication indicates that its due to MT initiated procedure (for example with establishment cause mt-signaling) then network understands that this is a BUSY procedure and not leaving procedure. Now with both this indications network understands that UE does not want to take up the downlink data or signaling. Thus, data is either aborted or buffered for future delivery at the network side.

In summary the solution uses two indications:
1) For example, called as the release indication (which indicates UE wants to release the NAS signaling connection); and
2) Indication whether the NAS message is
a) UE originated (also called as MO originated i.e. mobile originated) or
b) Is initiated in response to Paging message.

Using both this indications network determines that received NAS message is due to leaving procedure or Busy indication and decides whether to attempt to deliver the pending mobile terminated data/signaling or drop/buffer the pending mobile terminated data/signaling.

The above description is only from IDLE mode perspective same solution can be extended for INACTIVE state.

The above description is from the perspective of 5G system (5GS) same is applicable for 4G system (4GS) or evolved packet system (EPS). Where AMF is replaced with mobility management entity (MME), the next generation node B (gNB) is replaced with the eNB. The eNB and the gNB as used interchangeably in the specification but those represent the RAN nodes.

Figure 11:
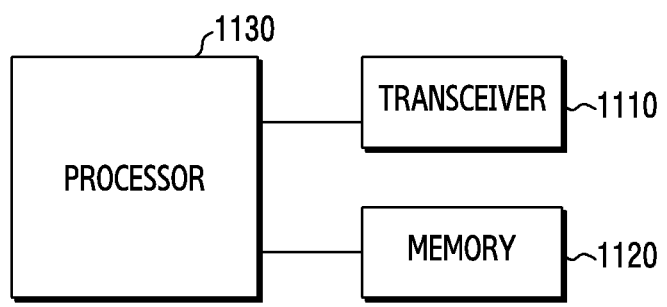
FIG. 11 is a block diagram of a configuration of a base station, according to an embodiment of the disclosure.

FIG. 11 is a block diagram of an internal configuration of a base station, according to an embodiment of the disclosure.

Referring to FIG. 11, the base station according to an embodiment may include a transceiver 1110, a memory 1120, and a processor 1130. The transceiver 1110, the memory 1120, and the processor 1130 of the base station may operate according to a communication method of the base station described above. However, the components of the base station are not limited thereto. For example, the base station may include more or fewer components than those described above. In addition, the processor 1130, the transceiver 1110, and the memory 1120 may be implemented as a single chip. Also, the processor 1130 may include at least one processor.

The transceiver 1110 collectively refers to a base station receiver and a base station transmitter, and may transmit/receive a signal to/from a terminal. The signal transmitted or received to or from the terminal may include control information and data. The transceiver 1110 may include a RF transmitter for up-converting and amplifying a frequency of a transmitted signal, and a RF receiver for amplifying low-noise and down-converting a frequency of a received signal. However, this is only an example of the transceiver 1110 and components of the transceiver 1110 are not limited to the RF transmitter and the RF receiver.

Also, the transceiver 1110 may receive and output, to the processor 1130, a signal through a wireless channel, and transmit a signal output from the processor 1130 through the wireless channel.

The memory 1120 may store a program and data required for operations of the base station. Also, the memory 1120 may store control information or data included in a signal obtained by the base station. The memory 1120 may be a storage medium, such as read-only memory (ROM), random access memory (RAM), a hard disk, a CD-ROM, and a DVD, or a combination of storage media.

The processor 1130 may control a series of processes such that the base station operates as described above. For example, the transceiver 1110 may receive a data signal including a control signal transmitted by the terminal, and the processor 1130 may determine a result of receiving the control signal and the data signal transmitted by the terminal.

Figure 12:
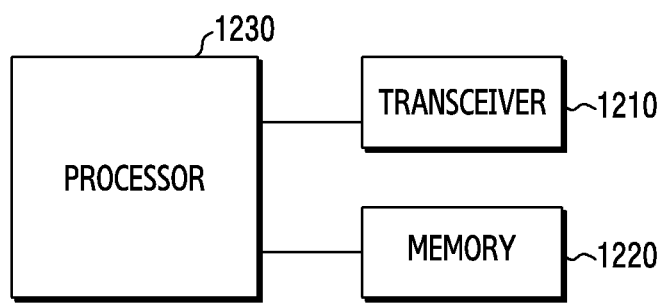
FIG. 12 is a block diagram showing a structure of a terminal, according to an embodiment of the disclosure.

FIG. 12 is a block diagram showing an internal structure of a terminal, according to an embodiment of the disclosure.

Referring to FIG. 12, the terminal of the disclosure may include a transceiver 1210, a memory 1220, and a processor 1230. The transceiver 1210, the memory 1220, and the processor 1230 of the terminal may operate according to a communication method of the terminal described above. However, the components of the terminal are not limited thereto. For example, the terminal may include more or fewer components than those described above. In addition, the processor 1230, the transceiver 1210, and the memory 1220 may be implemented as a single chip. Also, the processor 1230 may include at least one processor.

The transceiver 1210 collectively refers to a terminal receiver and a terminal transmitter, and may transmit/receive a signal to/from a base station. The signal transmitted or received to or from the base station may include control information and data. In this regard, the transceiver 1210 may include a RF transmitter for up-converting and amplifying a frequency of a transmitted signal, and a RF receiver for amplifying low-noise and down-converting a frequency of a received signal. However, this is only an example of the transceiver 1210 and components of the transceiver 1210 are not limited to the RF transmitter and the RF receiver.

Also, the transceiver 1210 may receive and output, to the processor 1230, a signal through a wireless channel, and transmit a signal output from the processor 1230 through the wireless channel.

The memory 1220 may store a program and data required for operations of the terminal. Also, the memory 1220 may store control information or data included in a signal obtained by the terminal. The memory 1220 may be a storage medium, such as ROM, RAM, a hard disk, a CD-ROM, and a DVD, or a combination of storage media.

The processor 1230 may control a series of processes such that the terminal operates as described above. For example, the transceiver 1210 may receive a data signal including a control signal, and the processor 1230 may determine a result of receiving the data signal.

The methods according to the embodiments described in the claims or the detailed description of the disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the disclosure has been described with embodiments, various changes and modifications may be suggested to one skilled in the art. It is intended that the disclosure encompass such changes and modifications as fall within the scope of the appended claims. None of the description in this application should be read as implying that any particular element, step, or function is an essential element that must be included in the claims scope. The scope of patented subject matter is defined by the claims. Also, the embodiments may be combined with each other as required. For example, a base station and a terminal may operate with some of the methods proposed in the disclosure combined together. Also, the embodiments are proposed based on a 5G or NR system, but other modifications based on technical ideas of the embodiments may be implemented on other systems, such as a long term evolution (LTE), long term evolution advanced (LTE-A), LTE-A-Pro systems, 6G network and an O-RAN network.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   transmitting, to an access and mobility management function (AMF) entity, a service request message associated with a service request procedure;
   identifying a transmission failure of the service request message; and
   in case that the service request procedure is triggered for requesting the AMF entity to release a non-access stratum (NAS) signaling connection, aborting the service request procedure upon occurrence of the transmission failure,
   wherein the UE supports a multi universal subscriber identification module (MUSIM), and
   wherein the releasing of the NAS signaling connection is requested for a first USIM of the UE due to an activity on a second USIM of the UE.

2. The method of claim 1, wherein the UE is in a 5GMM-CONNECTED mode or in a 5GMM-CONNECTED mode with a radio resource control (RRC) inactive indication and rejects a radio access network (RAN) paging of the AMF entity.

3. The method of claim 1, wherein the UE is in a 5GMM-IDLE mode and rejects a paging request of the AMF entity.

4. The method of claim 1, further comprising:
   locally releasing the NAS signaling connection;
   stopping a timer associated with the service request procedure; and
   locally releasing resources allocated for the service request procedure.

5. A method performed by a user equipment (UE) in a wireless communication system, the method comprising:
   transmitting, to a mobility management entity (MME), a service request message associated with a service request procedure;
   identifying a transmission failure of the service request message; and
   in case that the service request procedure is triggered for requesting the MME to release a non-access stratum (NAS) signaling connection, aborting the service request procedure upon occurrence of the transmission failure,
wherein the UE supports a multi universal subscriber identification module (MUSIM), and
wherein the releasing of the NAS signaling connection is requested for a first USIM of the UE due to an activity on a second USIM of the UE.

6. The method of claim 5, wherein the UE rejects a paging request of the MME.

7. A user equipment (UE) in a wireless communication system, the UE comprising:
a transceiver;
a memory storing one or more computer programs; and
one or more processors communicatively coupled to the transceiver and the memory,
wherein the one or more computer programs include computer-executable instructions that, when executed by the one or more processors individually or collectively, cause the UE to:
transmit, to an access and mobility management function (AMF) entity, a service request message associated with a service request procedure,
identify a transmission failure of the service request message, and
in case that the service request procedure is triggered for requesting the AMF entity to release a non-access stratum (NAS) signaling connection, abort the service request procedure upon occurrence of the transmission failure
wherein the UE supports a multi universal subscriber identification module (MUSIM), and
wherein the releasing of the NAS signaling connection is requested for a first USIM of the UE due to an activity on a second USIM of the UE.

8. The UE of claim 7, wherein the UE is in a 5GMM-CONNECTED mode or in a 5GMM-CONNECTED mode with a radio resource control (RRC) inactive indication and rejects a radio access network (RAN) paging of the AMF entity.

9. The UE of claim 7, wherein the UE is in a 5GMM-CONNECTED mode with an RRC inactive indication or in a 5GMM-IDLE mode and rejects a paging request of the AMF entity.

10. The UE of claim 7, the computer-executable instructions, when executed by the one or more processors individually or collectively, further cause the UE to:
locally release the NAS signaling connection,
stop a timer associated with the service request procedure, and
locally release resources allocated for the service request procedure.

11. A user equipment (UE) in a wireless communication system, the UE comprising:
a transceiver;
a memory storing one or more computer programs; and
one or more processors communicatively coupled to the transceiver and the memory,
wherein the one or more computer programs include computer-executable instructions that, when executed by the one or more processors individually or collectively, cause the UE to:
transmit, to a mobility management entity (MME), a service request message associated with a service request procedure,
identify a transmission failure of the service request message, and in case that the service request procedure is triggered for requesting the MME to release a non-access stratum (NAS) signaling connection, abort the service request procedure upon occurrence of the transmission failure,
wherein the UE supports a multi universal subscriber identification module (MUSIM), and
wherein the releasing of the NAS signaling connection is requested for a first USIM of the UE due to an activity on a second USIM of the UE.

12. The UE of claim 11, wherein the UE rejects a paging request of the MME.

* * * * *